(12) United States Patent
Ruid et al.

(10) Patent No.: US 7,279,438 B1
(45) Date of Patent: Oct. 9, 2007

(54) COATED INSULATION BOARD OR BATT

(75) Inventors: John O. Ruid, Schwenksville, PA (US); Murray Toas, Norristown, PA (US); Thomas A. Cuthbertson, Royersford, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 09/241,450

(22) Filed: Feb. 2, 1999

(51) Int. Cl.
B32B 27/12 (2006.01)
B32B 27/04 (2006.01)

(52) U.S. Cl. .................... 442/180; 442/381; 442/391

(58) Field of Classification Search ............... 442/180, 442/381, 391, 44, 38, 54, 55, 53; 423/141, 423/314.9, 332, 334; 138/128, 141, 146
See application file for complete search history.

(56) References Cited

U.S. PATENT DOCUMENTS

| | | | |
|---|---|---|---|
| 2,341,130 A | 2/1944 | Unsworth | 264/101 |
| 2,428,591 A | 10/1947 | Slayter | |
| 2,467,291 A | 4/1949 | Brelsford et al. | 156/62.6 |
| 2,619,151 A | 11/1952 | Sheidley | 264/115 |
| 2,647,857 A | 8/1953 | Horne | 208/217 |
| 2,695,855 A | 11/1954 | Stephens | |
| 2,768,026 A | 10/1956 | Stephens et al. | |
| 2,790,464 A | 4/1957 | Stephens et al. | |
| 2,825,389 A | 3/1958 | Stephens | 264/116 |
| 2,881,110 A | 4/1959 | Walker et al. | |
| 2,938,737 A | 5/1960 | Walker et al. | |
| 3,002,857 A | 10/1961 | Stalego | 428/378 |
| 3,025,197 A | 3/1962 | Sheidley | 428/142 |

(Continued)

FOREIGN PATENT DOCUMENTS

EP 0 763 690 A2 3/1997

(Continued)

OTHER PUBLICATIONS

*Wire Wound Rod*, Lembo-ITTI, http://www.lembo-itti.com/fx170005.htm Oct. 27, 1998.

(Continued)

*Primary Examiner*—Ula C. Ruddock
(74) *Attorney, Agent, or Firm*—Duane Morris, LLP (57) ABSTRACT

An insulation composite for attenuating energy or sound transmission has a body layer of insulating material with a roughly textured face and a uniform thickness solid cover layer permanently embedded in the body layer to a partial depth so that material of the body layer does not protrude through the surface of the cover layer. The body layer can be rigid board or resilient batting such as fiberglass. The cover layer is formed from a curable fluid cast onto the upwardly facing surface of the body layer. The uniform thickness of the cover layer is achieved by spreading the fluid over the surface utilizing a coating bar having a downwardly facing corrugated profile defining ridges in contact with the body layer and grooves between the ridges, such as a wire wound coating bar Some of the fluid is pressed into the body layer by the ridges while other fluid passes through the grooves then settles to uniform thickness over the wet surface of the body layer. The fluid is then cured to a solid state to form the cover layer.

23 Claims, 4 Drawing Sheets

U.S. PATENT DOCUMENTS

| | | | |
|---|---|---|---|
| 3,092,529 A | 6/1963 | Pearson | 138/149 |
| 3,093,037 A | 6/1963 | Ward, Jr. | 493/365 |
| 3,113,788 A | 12/1963 | Johnston | |
| 3,212,529 A | 10/1965 | Ullman et al. | 138/141 |
| 3,242,527 A | 3/1966 | Rosenberg | |
| 3,265,530 A | 8/1966 | Marzocchi et al. | |
| 3,394,737 A | 7/1968 | Hoffmann et al. | 138/109 |
| 3,396,070 A | 8/1968 | Gambill et al. | |
| 3,420,142 A | 1/1969 | Gale et al. | 409/304 |
| 3,492,771 A | 2/1970 | Jones et al. | |
| 3,507,730 A | 4/1970 | Gambill et al. | |
| 3,549,473 A | 12/1970 | LeBlanc et al. | 442/189 |
| 3,557,840 A | 1/1971 | Maybee | 138/149 |
| 3,605,534 A | 9/1971 | Barr | 409/304 |
| 3,615,969 A * | 10/1971 | Hegg | 156/78 |
| 3,616,181 A | 10/1971 | Stalego | |
| 3,642,554 A | 2/1972 | Hensley | 425/82.1 |
| 3,642,560 A | 2/1972 | Marsh, Jr. et al. | |
| 3,768,523 A | 10/1973 | Schroeder | 138/141 |
| 3,861,425 A | 1/1975 | Clark | 138/149 |
| 3,867,221 A * | 2/1975 | Chant | 264/321 |
| 3,885,593 A | 5/1975 | Koerber et al. | 138/128 |
| 3,915,783 A * | 10/1975 | Goppel et al. | 428/297.4 |
| 3,942,774 A | 3/1976 | Sokolow | |
| 3,945,962 A | 3/1976 | Clark | |
| 3,980,511 A | 9/1976 | Proucelle | |
| 3,996,824 A | 12/1976 | Cailey | |
| 4,002,367 A | 1/1977 | Thomas | |
| 4,005,234 A | 1/1977 | Stroupe | 138/141 |
| 4,067,678 A | 1/1978 | Beranek, Jr. et al. | 425/305.1 |
| 4,070,954 A | 1/1978 | Cailey | |
| 4,101,700 A * | 7/1978 | Ray et al. | 428/131 |
| 4,175,159 A | 11/1979 | Raleigh | 428/405 |
| 4,179,808 A | 12/1979 | Smith | |
| 4,183,379 A | 1/1980 | Marquette et al. | 138/158 |
| 4,196,755 A | 4/1980 | Kutnyak et al. | 138/150 |
| 4,226,662 A | 10/1980 | McCort | |
| 4,243,075 A | 1/1981 | McPherson et al. | |
| 4,304,267 A | 12/1981 | Campbell, Jr. | 138/149 |
| 4,310,585 A | 1/1982 | Shannon | 428/218 |
| 4,389,587 A | 6/1983 | Levine et al. | 310/208 |
| 4,456,637 A | 6/1984 | Takeda et al. | 427/355 |
| 4,528,053 A | 7/1985 | Auer | 156/204 |
| 4,573,715 A | 3/1986 | Armbruster | 285/94 |
| 4,621,013 A | 11/1986 | Holtrop et al. | 442/226 |
| 4,680,070 A | 7/1987 | Hughes | 156/218 |
| 4,709,523 A | 12/1987 | Broderick et al. | 52/506.05 |
| 4,758,395 A | 7/1988 | Zion | |
| 4,824,714 A | 4/1989 | Gest | |
| 4,839,222 A | 6/1989 | Jain | 442/375 |
| 4,887,663 A | 12/1989 | Auxier et al. | 165/47 |
| 4,895,745 A | 1/1990 | Vesley et al. | 428/404 |
| 4,909,282 A | 3/1990 | Staugaard | 138/149 |
| 4,968,556 A | 11/1990 | Jain | 442/139 |
| 4,983,081 A | 1/1991 | Cunningham, Jr. | 83/39 |
| 4,990,370 A | 2/1991 | Terry et al. | 427/209 |
| 5,008,131 A | 4/1991 | Bakhshi | |
| 5,009,932 A | 4/1991 | Klett et al. | |
| 5,020,481 A | 6/1991 | Nelson | 122/494 |
| 5,025,052 A | 6/1991 | Crater et al. | 524/104 |
| 5,144,795 A | 9/1992 | Field | 60/226.1 |
| 5,169,700 A * | 12/1992 | Meier et al. | 428/74 |
| 5,186,704 A | 2/1993 | Cunningham, Jr. | 493/18 |
| 5,300,592 A | 4/1994 | Kanagawa et al. | 525/488 |
| 5,310,594 A | 5/1994 | Holland et al. | 428/167 |
| 5,314,719 A | 5/1994 | Batdorf et al. | 427/385.5 |
| 5,370,919 A | 12/1994 | Fieuws et al. | 428/96 |
| 5,371,989 A | 12/1994 | Lehnert et al. | |
| 5,379,806 A | 1/1995 | Matthews et al. | 138/149 |
| 5,385,610 A | 1/1995 | Deerer et al. | 118/241 |
| 5,391,840 A | 2/1995 | Hughes et al. | |
| 5,397,631 A * | 3/1995 | Green et al. | 428/219 |
| 5,421,938 A | 6/1995 | Cunningham, Jr. | 156/217 |
| 5,460,206 A | 10/1995 | Sansoucy | 138/149 |
| 5,487,412 A | 1/1996 | Matthews et al. | 138/149 |
| 5,528,904 A | 6/1996 | Jones et al. | 60/753 |
| 5,534,298 A | 7/1996 | Cross et al. | 427/358 |
| 5,549,942 A | 8/1996 | Watts | |
| 5,567,504 A * | 10/1996 | Schakel et al. | 428/167 |
| 5,578,258 A | 11/1996 | Grant et al. | 264/118 |
| 5,612,405 A | 3/1997 | Bainbridge et al. | |
| 5,624,471 A | 4/1997 | Gaeta et al. | |
| 5,625,999 A * | 5/1997 | Buzza et al. | 52/793.11 |
| 5,712,012 A | 1/1998 | Forman et al. | |
| 5,750,225 A | 5/1998 | Petty | 428/36.2 |
| 5,762,109 A | 6/1998 | Matthews et al. | 138/149 |
| 5,765,586 A | 6/1998 | Facas et al. | 137/15.01 |
| 5,776,841 A | 7/1998 | Bondoc et al. | |
| 5,783,268 A | 7/1998 | Noonan et al. | 428/34.5 |
| 5,783,623 A | 7/1998 | Skoufis et al. | 524/459 |
| 5,836,357 A | 11/1998 | Kittson et al. | 138/98 |
| 5,953,818 A | 9/1999 | Matthews et al. | 29/890.144 |
| 5,958,137 A | 9/1999 | Caldwell et al. | 118/663 |
| 5,985,429 A | 11/1999 | Plummer et al. | 428/220 |
| 6,000,437 A * | 12/1999 | Ponder et al. | 138/149 |
| 6,148,867 A | 11/2000 | Matthews et al. | 138/149 |
| 6,207,245 B1 * | 3/2001 | Miller et al. | 428/41.8 |
| 6,213,522 B1 | 4/2001 | Jacobson et al. | 225/64 |
| 6,231,927 B1 | 5/2001 | Ruid | 427/358 |
| 6,270,865 B1 | 8/2001 | Noonan et al. | 428/34.5 |
| 6,331,350 B1 | 12/2001 | Taylor et al. | 428/221 |
| 6,457,237 B1 | 10/2002 | Matthews et al. | 29/890.144 |
| 2001/0033782 A1 | 10/2001 | Conley | 409/132 |
| 2001/0033926 A1 | 10/2001 | Matthews et al. | 428/316.6 |
| 2002/0127399 A1 | 9/2002 | Mankell et al. | 428/375 |
| 2002/0146521 A1 | 10/2002 | Toas et al. | 428/34.1 |
| 2003/0008092 A1 | 1/2003 | Toas et al. | 428/36.91 |
| 2003/0032351 A1* | 2/2003 | Horner et al. | 442/76 |
| 2003/0068943 A1 | 4/2003 | Fay | 442/76 |

FOREIGN PATENT DOCUMENTS

| | | |
|---|---|---|
| ES | 9402661 | 12/1994 |
| FR | 1137652 | 6/1957 |
| WO | WO 99/00338 | 1/1999 |

OTHER PUBLICATIONS

*Smooth Stainless Steel Rods*, etc., RD Specialties, Webster, NY.
*Precision Coating Rods and Laboratory Products*, Industry Tech, Oldsmar, FL.
Weiss, H. L., *Coating and Laminating Machines*, Converting Technology Co., Milwaukee, WI, 1977, pp. 7-9, 196-202 and 228-239.
Weiss, Herbert L., Coating and Laminating, Converting Technology Company, Milwaukee, Wisconsin, pp. 7-9, 196-202.
Elasti-Glass® R3100B Series Glass Fiber Mats, Schuller, 2 pages.
Knauf Air Duct Board, Form No. AH-SS-2 Effective: Jan. 1998, 2 pages.
Knauf Fiber Glass Insulation—Products 7 pages.
CertainTeed Specification Sheet, ToughGard™ Duct Board, 2 pages.
Testing Data from the Competitive Audit on Mar. 25, 1999, 3 pages.
"Smooth Stainless Steel Rods, etc.", RD Specialties, Webster, NY.
"Wire Wound Rod," Lembo-ITTI, http://www.lembo-itti.com/fx170005.htm Oct. 20, 1998.
Precision Coating Rods and Laboratory Products, Industry Tech, Oldsmar, FL.
Underwriters Laboratories Inc., "Report on Air Ducts", Jun. 8, 1992, Northbrook, Illinois, USA.
CertainTeed Corporation, "Certa*Faced Ultra*Duct Marketing Plan", Nov. 22, 1993.
CertainTeed Corporation, "Product Specification: PS 57.00", May 23, 1994.
CertainTeed Corporation, "Raw Material Specification: Certa*Faced Ultra*Duct Mat Facing", Jun. 23, 1994.

CertainTeed Corporation, "List Prices—*ToughGard* Duct Board", Oct. 1, 1994, Valley Forge, Pennsylvania, USA.

Underwriters Laboratories Inc., "Investigation of 'Climaver 284' Air Duct Board", Dec. 19, 1991, Northbrook, Illinois, USA.

North American Insulation Manufacturers Association, "Fibrous Glass Duct Construction Standards", 2nd Edition, 1993.

Owens Corning, "Submittal Sheet–*EnDura* Coat Duct Board", May 2001, USA.

CertainTeed Corporation, "Specification Sheet—*ToughGard* Duct Board with Enhanced Surface", Jan. 2002.

CertainTeed Corporation, "Specification Sheet—Ultra*Duct Gold", Mar. 2002.

Owens Corning, "Submittal Sheet—*Aeromat* Duct Liner", May 2001, USA.

Knauf Fiber Glass GmbH, "Submittal Sheet—Air Duct Board-M with Hydroshield Technology", Oct. 2000, USA.

Aircon, "Ventilation, Extraction and Air Conditioning—Installation Materials", Nov. 1991.

Underwriters Laboratories Inc., "Gas and Oil Equipment 1993".

Underwriters Laboratories Inc., "Gas and Oil Equipment 1994".

Underwriters Laboratories Inc., "Gas and Oil Equipment 1995".

CertainTeed Corporation, "Product Sheet—*ToughGard* Duct Board Fiber Glass Duct Board Systems", 1994, Valley Forge, Pennsylvania, USA.

CertainTeed Corporation, Certain Teed Building Solutions, "Product Information," CertainTeed Duct Insulation.

Johns-Manville Fiber Glass, "Micro-Aire Duct Systems Fabrication Manual", USA.

Johns-Manville Manufacturing, "Product Specification—Micro-Aire Duct Board Standard Duty Heavy Duty Spec No. 4365-20", 1971-1973, USA.

Johns-Manville Manufacturing, "Product Specification—Micro-Aire Duct Board Standard Duty Heavy Duty Spec No. 4365-15", 1971-1973, USA.

Johns-Manville, Air Handling Systems—SuperDuct™ Coated High Performance Air Duct Board, Type 475 & 800, AHS 200 Jun. 2000.

Johns-Manville, "Air Handling Systems—Linacoustic RC™ Fiber Glass Duct Liner with Reinforced Coating System," (preliminary product information), AHS-329 Feb. 2002.

CETIAT "Test Report" Jul. 24, 1991, 6 pages (including translation attached).

French Republic, National Testing Laboratory, Nov. 28, 1998, 18 pages (including translation attached).

Glasuld "Product Data-Industrial Sheet Black" Sheet: 172 page 1, Nov. 1989, 1 page (14 pages, including translation of the relevant parts of the Danish ventilation attached).

Isover "Price List" Jan. 1991, 51 pages (including translation attached).

Isover Saint-Gobain Roche & Verre-Insulation and Air Conditioning, Mar. 1990, 8 pages (including translation attached).

Roclaine Isover, "Recommended Prices Jan. 1993," Cristaleria Espanola S.A., Insulation Division, Jan. 1993, 53 pages (including translation attached).

Ultra Additives Catalog, DEE FO/AGITAN defoamers, reprinted Jan. 21, 2003 from http://www.ultraaditives.com.

Weiss, Herbert L., Coating and Laminating, Converting Technology Company, Milwaukee, Wisconsin, pp. 7-9, 196-202 and 228-238, Copyright © 1977.

Elasti-Glass® R3100B Series Glass Fiber Mats, Schuller, 2 pages, Effective Date May 1997.

Knauf Fiber Glass Insulation—Products 7 pages, Copyright © 2002.

CertainTeed Specification Sheet, ToughGard™ Duct Board, 2 pages, © CertainTeed Apr. 2001.

"Precision Coating Rods and Laboratory Products", Industry Tech, Oldsmar, FL Jul. 1988.

Owens Corning, "Submittal Sheet—*EnDura* Coat Duct Board", May 2001, USA.

CertainTeed Corporation, "Production Sheet—*ToughGard* Duct Board Fiber Glass Duct Board Systems", 1994, Valley Forge, Pennsylvania, USA.

Johns-Manville Fiber Glass, "Micro-Aire Duct Systems Fabrication Manual", USA, Jun. 1970.

CertainTeed Corporation, "Specification Sheet—ToughGard™ Duct Liner with Enhanced Surface", 2001.

Climaver 234, 1982.

Climaver 254, 1984.

Climaver 264, 1982.

Climaver Plata, Specification of a Product, Relevance on first page, density 70 mm per liter cube (not translated).

Glasuld Ventilations-Kanaler, 1989.

Isover "Gama Climaver", 1989?

CertainTeed, Tough Gard™ Duct Board Fiber Glass Duct Board Systems, no date.

Isover Gullfiber—translation of the relevant parts of the Danish ventilation duct product "Industriplad Sort" and the corresponding Ventilation Duct Application brochure, no date provided.

Isover Roclaine, "Recommended Prices Jan. 1990", Cristaleria Espanola S.A., Insulation Division, Jan. 1993, 3 pages (translation attached).

Isover Roclaine, "Recommended Prices Jan. 1991," Cristaleria Espanola S.A., Insulation Division, Jan. 1993, 3 pages (translation attached).

Johns-Manville, "Super Duct™" Air Duct Board Fabrication Instructions, AHS-204, Feb. 1998.

Johns-Manville Manufacturing, "Finished Product Specification—Mat Faced Mad Board Spec No. 4365-15.6", 1971-1973, USA.

Mid-rise and High-rise Exterior Building Envelope Board, Current System—Massachusetts "specifications", no date provided.

RD Specialties, "Smooth Stainless Steel Rods, etc.", Webster, NY, no date provided.

* cited by examiner

COATED INSULATION BOARD OR BATT

FIELD OF THE INVENTION

This invention relates to composites coated on a roughly textured face. More specifically, it relates to a uniform thickness coating of a cast cover layer on a fiberglass insulation batt or board, and to an apparatus for making the composite.

BACKGROUND AND SUMMARY OF THE INVENTION

Batting, boards and other composite products for thermal and acoustical insulation typically include one or more layers of a low density web of nonwoven fiber or foamed insulating material. Frequently, improved properties and enhanced performance are sought by coating a face of the composite with a cover layer. For example, to increase stiffness, provide puncture protection, or reduce permeability, paper, foil, and/or film is sometimes laminated to the face.

Occasionally a very flexible, continuous skin on the insulating material is desired. A cover layer of this type can be produced from a liquid capable of curing by drying or reacting. However, it can be very difficult to efficiently coat insulation material with a liquid because the fibrous or foamed substrate is very porous and has a roughly textured surface. Hence, the cover layer normally needs to be very thick to fill the pores so as to provide continuous coverage. As a result, conventional covered insulation materials consume an excessive amount of coating material.

Frequently low density webs of non woven or foamed insulation material are flexible and resilient. This characteristic adds to the difficulty of casting a liquid onto the very open surface. Traditional coating machines for resilient webs typically involve picking up coating liquid onto a smooth surface of a drum rotating in a trough of the liquid and transferring the liquid onto the underside of moving web. Then excess liquid is scraped from the underside by a bar FIG. 1 of U.S. Pat. No. 4,456,637 exemplifies an apparatus for this process. This type of apparatus functions best for low viscosity coating liquids. Because the coating liquid for low density, resilient, porous insulating webs is usually highly viscous, an underside coating technique normally is unacceptable.

Roughly textured surfaces can be coated with a viscous liquid by laying a bead of casting liquid on top of the horizontal substrate then dragging a straight profile doctor blade across the surface. Because the doctor blade rides on the highest points of the textured surface, the coating is deep over the surface pores and shallow where the substrate fiber or foam structure ascends to peaks. The peaks of the substrate sometimes protrude above the cover layer. The thickness of a cover layer on a roughly textured composite made with a straight doctor blade thus tends to vary to an unacceptable extent.

It is desirable to have a roughly textured composite, such as insulation batting or board, with a uniform thickness, flexible cover layer cast from a curable liquid Accordingly, there is now provided a composite comprising at least one body layer having a roughly textured face and a cover layer of a solid of a cured liquid cast on the textured face, in which the cover layer has a substantially uniform thickness and is permanently embedded into the body layer to a depth less than the thickness.

A novel apparatus for applying a uniform thickness cover layer onto a roughly textured composite also has been discovered, This apparatus for casting a uniform thickness of a curable liquid onto an upper surface of a horizontally moving web comprises
  a pair of parallel, laterally spaced apart vertical side plates, each plate defining a bottom edge;
  a coating bar disposed horizontally between the side plates above the bottom edges, the coating bar having a corrugated axial profile defined by a plurality of alternating downwardly facing ridges and grooves;
  support means for carrying the moving web in contact with the downwardly facing ridges in a machine direction parallel to the plates; and
  nozzle means upstream of coating bar and between the plates for delivering the curable liquid onto the upper surface of the moving web.

There is further provided a process for making an insulation composite comprising the steps of
  placing in a substantially horizontal position a body layer of insulating material having an upwardly directed, roughly textured face;
  casting a liquid capable of curing to a solid onto the textured face;
  moving the body layer horizontally relative to a horizontally disposed coating bar having a downwardly facing corrugated axial profile defining alternating ridges and grooves such that the ridges contact the face;
  pressing a first portion of the liquid in proximity of the ridges into the body layer while passing a second portion of the liquid through the grooves;
  allowing the second portion of the liquid to settle in a substantially uniform thickness layer over the first portion of liquid; and
  curing the liquid to a solids thereby producing a cover layer of substantially uniform thickness permanently embedded in the face of the body layer.

Yet further this invention provides an insulation composite produced according to the aforementioned novel process.

DETAILED DESCRIPTION

Figure 1A:
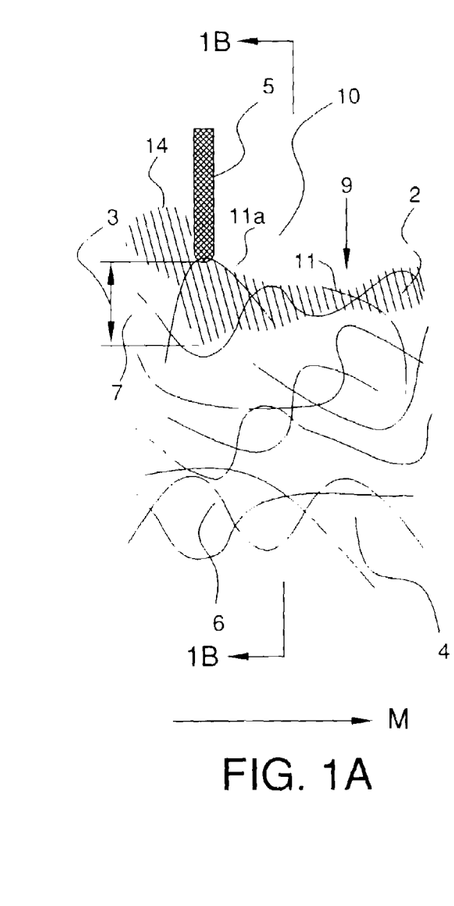
FIG. 1A is a section view in the cross machine direction of a portion of a conventional, roughly textured substrate coated with a cover layer.
Figure 1B:
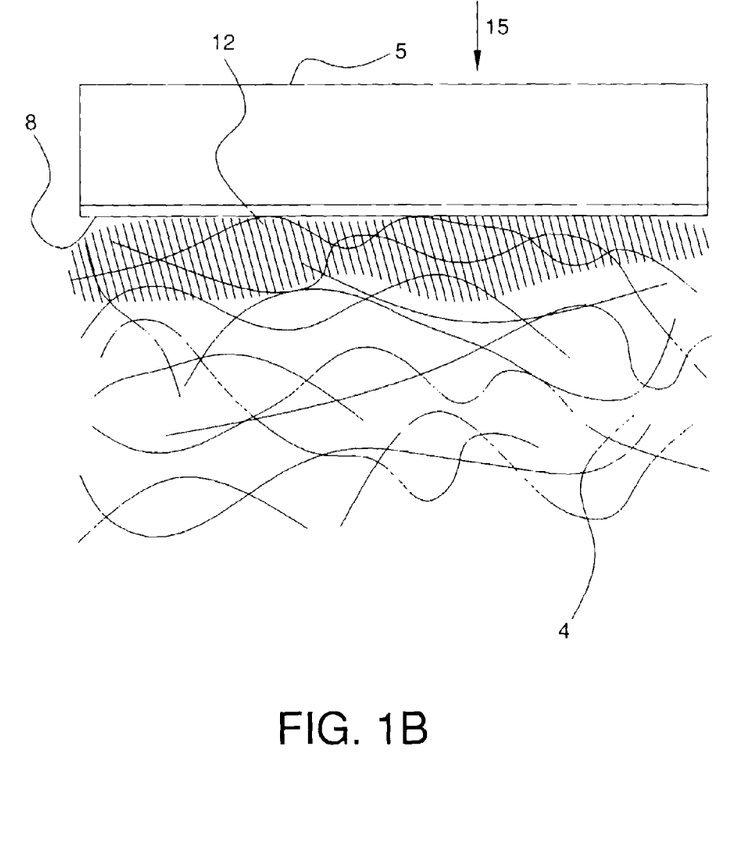
FIG. 1B is a section view of the coated substrate of FIG. 1A viewed in the machine direction along line 1B-1B.

For better understanding of the present invention, attention is first directed to FIGS. 1A and 1B which show a roughly textured substrate coated in the traditional manner. These figures illustrate a representative resilient, porous insulation batting 10 comprising a body layer of a web 4 of nonwoven fibers 6 and a cover layer 2. For sake of illustration only a few of the fibers that may be present in an actual insulation batting are shown. It is seen that the web is very open and porous due to spacing between the fibers. Also, certain fibers 7 terminate at or near the top surface of the web. These features make the surface textured. The cover layer 2 of cast polymer composition is seen applied to the textured surface of web 4 by a conventional process such as a knife-over-blanket, or floating knife process, utilizing a coating blade 5. The method of application basically involves depositing a continuous cross machine direction puddle 14 of the cover layer composition in liquid form on the surface of the moving web upstream of the blade. As shown, the web is moving relative to the blade in the machine direction indicated by arrow M. The liquid is usually very viscous and slowly begins to descend into the upper portion of the web. As the web moves under and in contact with the coating bar, the liquid is forced under the blade and into the upper portion of the web.

As seen in FIG. 1B, conventional coating blade 5 has a straight edge 8 along the full length of the blade in the cross machine direction. This edge is normally disposed horizontally and in contact with the uppermost fibers 11 and 12 of the web. Accordingly, the liquid is scraped into the web to the height of edge 8. Nonwoven fibrous webs usually exhibit some variability in the elevation of the uppermost fibers. FIG. 1A somewhat exaggerates the variation in height of upper fibers 11 in the machine direction and FIG. 1B similarly shows height variation of fibers 12 in the cross machine direction. Downward blade pressure also typically compresses the nonwoven fibers thereby distorting the web locally beneath the blade. This variability is also found in rigid textured surface substrates such as rigid insulation board. After being applied, the liquid is cured to produce a permanent cover layer embedded in the upper portion of the web.

The thickness of the cover layer normally produced by a conventional, straight coating bar is disadvantageously non-uniform from point to point over the surface of the web. With reference to FIG. 1A it is seen that edge 8 of blade 5 forces the cover layer below a varying elevation set by the uppermost fibers as the web moves in the machine direction under the blade. The liquid will descend into the web to a depth largely determined by the structure of the web. That is, the more open the structure, the more deeply the liquid will penetrate. Consequently, the cured liquid cover layer can vary from a very large thickness 3 to a very small thickness shown at the machine direction point designated by arrow 9 in FIG. 1A. Occasionally, the uppermost fibers can protrude upward through the polymer and ultimately extend above the cover layer, as exemplified by fiber 11a This undesirable characteristic occurs most frequently in webs of resilient fibers such as fiberglass insulation batting. Furthermore, the cover layer can build up, for example at the position designated by arrow 15 in FIG. 1B, where the top surface of the web drops below the elevation of the uppermost fiber 12 because the horizontal, straight edge 8 scrapes off the liquid to a constant elevation in the cross machine direction set by the uppermost fibers.

Figure 2A:
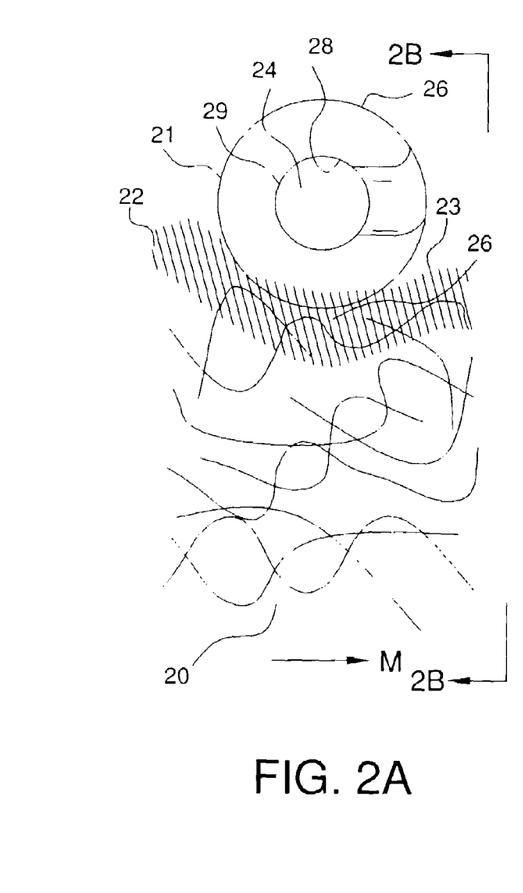
FIG. 2A is a section view in the cross machine direction of a portion of a roughly textured substrate coated with a cover layer cast from a curable liquid according to the present invention.
Figure 2B:
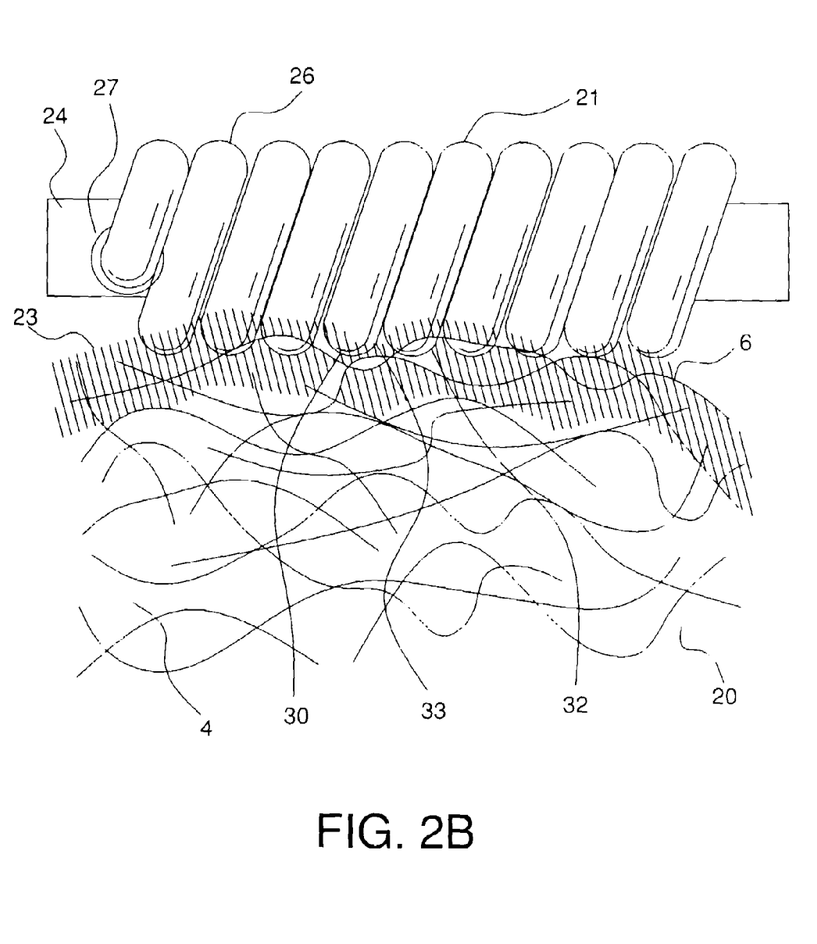
FIG. 2B is a section view of the coated substrate of FIG. 2A viewed in the machine direction along line 2B-2B.

FIGS. 2A and 2B depict the coating of a batt 20 of a web 4 of nonwoven fibers 6 with a coating bar 21 according to an embodiment of the present invention As before, a cross machine direction puddle 22 of curable liquid form is deposited upstream of the coating bar with the web moving continuously in machine direction designated by the arrow M relative to the bar. The coating bar spreads the liquid over the top surface of the web to produce a uniformly thick cover layer 23 which subsequently can be set to become permanently embedded in the upper portion of the web.

It is seen that the coating bar 21 comprises a rigid elongated rod 24 axially disposed within the bar. The rod is circumferentially wrapped with a helical coil of tightly wound wire 26. The ends of the wire are inserted into radial holes 27 to secure the wire to the rod. The mechanism for securing the wire to the rod is not critical and other techniques can be used, such as welding or soldering. The term "tightly wrapped" means that the inner diameter 28 of the wire coil is in contact with the circumference 29 of the rod 24. As shown, each turn of the wire coil is in abutting contact with adjacent turns.

The bottom surface 30 of the coating bar presents a corrugated axial profile in contact with the upper surface of the web to be coated. The profile is characterized by a plurality of downwardly facing ridges 32 separated by V-shaped grooves 33. While not wishing to be bound by a particular theory, it is felt that corrugated profile is primarily responsible for achieving the highly uniform thickness of cover layer on the textured surface of the substrate. The cover layer liquid is pressed below the surface of the web by the ridges which contact the uppermost fibers of the web as the web moves tinder the coating bar. The grooves fill with liquid which passes beneath the bar without being pressed into the web. After the bar passes a particular point on the web, the liquid that had been confined in the grooves is released. Surface tension and gravity tend to spread the released liquid over the fresh coating liquid that had been pressed into the web by the ridges of the corrugation profile. Thus, the released liquid builds up to a notably uniform thickness coating which can be cured to form a permanent cover layer on the web.

With reference to FIG. 2B it is seen that the thickness of the cover layer 23 is substantially uniform across the web in the cross machine direction. By appropriately metering the amount of liquid continuously cast on the web upstream of the coating bar within a preselected range, it is further possible to maintain a substantially uniform thickness of the cover layer in the machine direction as seen in FIG. 2A. Additionally, the fibers 6 of the upper portion of the web are deeply embedded within the cover layer. That is, the cover layer descends into the body of the nonwoven web to a depth which is less than the cover layer thickness. Because the cover layer docs not descend to a greater depth than its thickness, the uppermost fibers are completely encased within and do not protrude upward through the cover layer Accordingly, the cover layer provides a smooth top surface to the coated web. Moreover, after the coating liquid has cured, the cover layer becomes permanently attached to the top of the body layer as a consequence of the uppermost fibers 6 being deeply embedded in the cover layer. Preferably, the cover layer is embedded in the body layer to a depth of at most about 95%, and more preferably at most about 75%, of the uniform thickness.

The uniform thickness of the cover layer is in the range of about 0.01 to 1 mm. The uniform thickness of the cover layer varies by at most about 1 mm.

The present invention is primarily directed to placing a flexible cover layer on at least one surface of thermal or sound insulation products. These insulation products are usually in the form of batting or boards to attenuate the transmission of thermal energy through or sound along structural surfaces, such as walls and ducts. This attenuation is chiefly accomplished by use of one or more body layers of low density insulating material. The cover layer composition is primarily selected for its ability to protect the underlying body layer of insulating material from erosion by gas and/or particles flowing adjacent to the body layer and to prevent the escape of fibers or other particles from the body layer into the neighboring environment. The cover layer can also have insulating properties.

The body layer to which the cover is applied generally is of nonwoven fibers or foam having a porous structure which has an exposed surface of rough texture on a micro scale. That is, at the scale of millimeters and smaller, the fibers and foam of the body layer define an uneven, grainy surface with peaks and valleys of typically random and irregular height, depth and span.

The body layer can be any of the well known insulating materials. Such materials span the range from light weight, flexible and resiliently compressible foam and nonwoven fiber web to rigid or semi-rigid boards. Generally, these insulating materials have density in the range of about 0.5-7 lbs./ft$^3$ (8-112 kg/m$^3$). Foam and nonwoven fiber web materials are usually provided in continuous sheeting which is sometimes cut to preselected lengths, thus forming batts. These articles usually are low density in the range of about 0.5-6 lbs./ft$^3$ (8-96 kg/m$^3$), and preferably about 1-4 lbs./ft$^3$ (16-64 kg/m$^3$). Rigid to semi-rigid insulation boards are often made of cementitious mineral composition and thus tend to have density in the higher portion of the range, at about 2-7 lbs./ft$^3$ (32-112 kg/m$^3$), and preferably about 4-7 lbs./ft$^3$ (64-112 kg/m$^3$). These boards customarily are produced as sheets typically in the range of 0.25-2 inches in thickness and about 2-4 feet wide by about 4-12 feet long.

The present invention is useful for covering a body layer of flexible, resilient, low density web of nonwoven fibers. This web can be formed by various methods well known in the art including dry laying processes, such as air laying, melt blown and spunbond processes, wet laying processes and combinations of them. The fibers in the web can be loose or held together at random or non-random points of intersection with other fibers by mechanical methods, such as stitching or by adhesive methods. Synthetic fibers, especially thermoplastic fibers can be thermally bonded at such intersection points. The surface can be naturally textured and texture can optionally be augmented with carding or needle punching.

A composite body layer of multiple nonwoven webs is also contemplated by this invention. The multiple webs can be stacked without being bound to adjacent layers or the composite can be laminated by binding some or all of adjacent layers by mechanical, adhesive or thermal methods of the types previously mentioned. A preferred type of composite web body layer includes a thick, e.g., about 0.5-6 inch (1.3-15 cm) nonwoven web faced with a second, much thinner web which can he a nonwoven, a net or a scrim fabric. The second web typically is a very open, high porosity web of about 0.062-0.25 inch (1.6-6.4 mm) thickness. In such composite, the cover layer can be applied onto the side of the body layer faced with the second web, i.e., on top of the second web so that the second web is embedded in the cover layer. In a preferred embodiment, a body layer comprises a body layer of wet laid glass fiber nonwoven. In a particularly preferred embodiment, the wet laid glass fiber nonwoven is faced on the cover with a second nonwoven.

The diameter of fiber suitable for use in this invention preferably is in the range of 3 to 25 μm. Mineral fibers, synthetic, usually thermoplastic polymer fibers, cellulosic fibers and mixtures of these can be used. Generally, the overall thickness of the body layer is about 0.5-6 inches (1.3-15 cm) thick. Flexible, resilient foam, such as polystyrene, is also a preferred insulation material. Optionally, the composite coated body layer of this invention can be faced, preferably on the side opposite the coated side, with an outer layer of metal foil, organic film, paper or combination. Examples include aluminum foil, polyethylene film and kraft paper. This outer layer can be tailored to provide additional protection to the insulating material of the body layer, improved stiffness, a surface to grip the composite for mounting in an end use application, or barrier properties, such as moisture permeation resistance.

The cover layer preferably comprises an elastically deformable, flexible and resilient composition. The composition is cast as a liquid on the body layer of insulating material, spread to a uniform thickness on the surface of the body layer and then cured. The cast liquid can be foamed. Prior to curing, the liquid penetrates into the portion of the body layer near the surface. Preferably, the liquid is sufficiently tacky that it adheres to the fibers of the body layer. The term "curing" is used broadly to include various processes such as chemical reaction and or drying that cause the composition to set to a non-tacky solid and to permanently bond the cover layer to the fibers or foam structure of the body layer.

The method of curing depends upon the nature of the cover layer liquid. For example, the liquid can be a solution of a high molecular weight polymer in a volatile solvent or a dispersion of solids in a liquid vehicle. Such liquid can be cured by drying, i.e., by devolatilizing the solvent or liquid vehicle. The liquid can also he a reactive polymer precursor which can be cured by reaction with a comonomer, catalyst, and/or introduction of heat, light, radiation and the like.

Preferably, the elastically deformable composition of the cover layer includes a polymeric component, such as acrylic polymer, styrenic polymer, polyvinyl acetate, and mixtures thereof. The polymeric component can be any well known elastomeric polymers, such as the polymeric latex composition disclosed in U.S. Pat. No. 5,567,504, the complete disclosure of which is incorporated herein by reference. An acrylic polymer latex is preferred.

In the liquid state, the cover layer composition according to this invention is highly viscous. The viscosity of the liquid in a quiescent condition at room temperature should be about 1,000-500,000 cps, and preferably about 10,000-200,000 cps. Liquids contemplated for coating in accordance with this invention frequently exhibit a shear thinning behavior. That is, the viscosity lowers upon application of shear. Because the process of applying the coating liquid typically involves shearing the liquid, the viscosity during casting onto the body layer can be lower than the indicated quiescent liquid viscosity.

In an important aspect of the practice of this invention, the highly viscous, uncured liquid of the cover layer is spread over the surface of the body layer utilizing a corrugated coating bar. The structure of the corrugated coating bar is characterized by a plurality of alternating axial ridges and grooves. In a preferred embodiment, the corrugated structure is achieved by winding a wire tightly about a cylindrical rod. Wire wound coating bars are well known in the art and are sometimes referred to as "wire wound doctors" and "Mayer" rods or bars. Traditionally, wire wound doctors are used to scrape excess low viscosity coating liquids applied to the underside of a horizontal substrate by a roll coater. The manufacture of such wire wound coating bars is well known in the art. For example, this subject is discussed in previously mentioned U.S. Pat. No. 4,456,637 the complete disclosure of which is incorporated herein by reference. They can be obtained from such suppliers as RD Specialties, Webster, N.Y., and Industry Tech, Oldsmar, Fla.

In the present invention, the corrugated coating bar is preferably of the wire wound cylindrical rod type. Other rod shapes, such as triangular cross section can be used. Also, the corrugated structure can be obtained without winding wire about a rod. For example, the coating bar can be a screw threaded cylinder or a serrated edge bar.

In any particular application, the diameter of the rod and gauge of the wire, i.e., the size of the ridges and grooves will depend largely on desired thickness of the coating layer, the viscosity of the cover layer liquid and the porosity of the textured surface of the substrate. Large grooves can be obtained by tightly wrapping two wires of same diameter on a rod followed by a third wire positioned in the helical groove between the first two wires. Preferably, the coating bar as intended for use in this invention will comprise a cylindrical rod of diameter of about 0.25-2 inches and wire of about 0.1-5 mm diameter. Material of construction of the coating bar is not critical except that the composition should be strong enough to remain rigid during application of the cover layer liquid. Although a single corrugated coating bar can be sufficient, it is contemplated that two or more bars in series may be used to produce the desired thickness and/or smoothness of the cover layer on the body layer.

Figure 3:
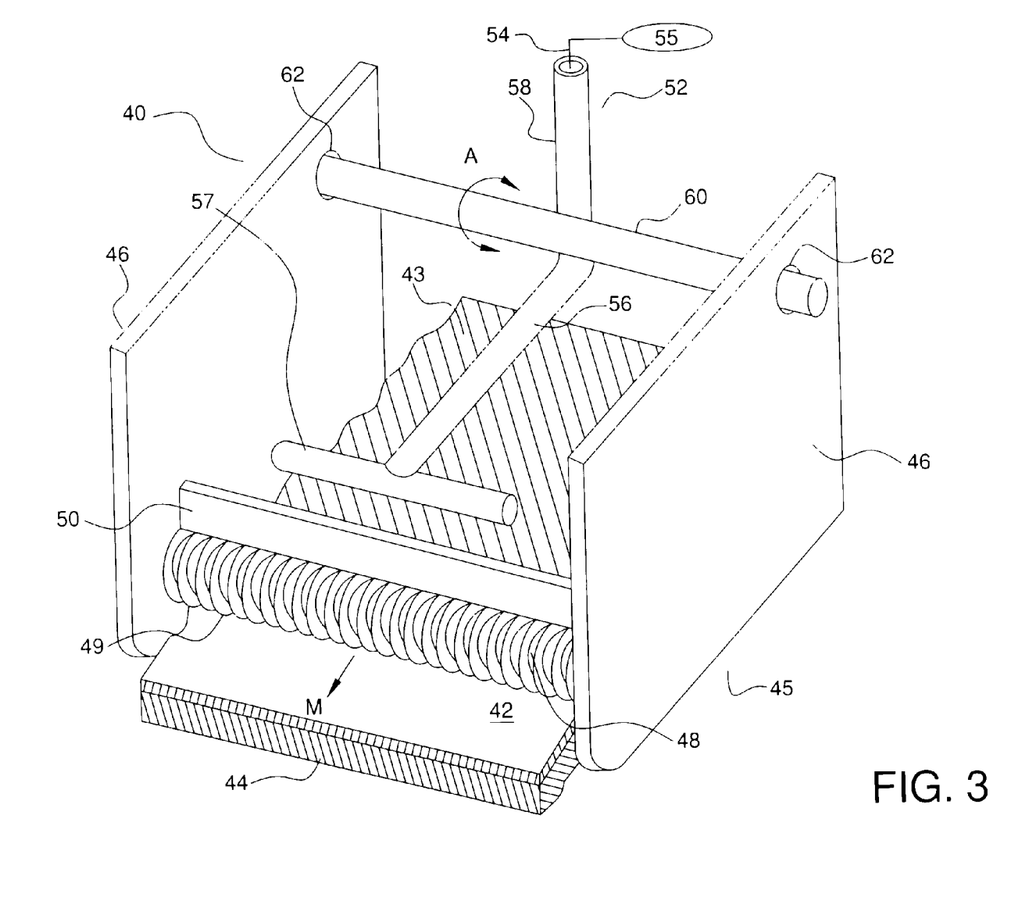
FIG. 3 is a perspective view of a preferred embodiment of an apparatus useful for making coated insulation of this invention.

A preferred apparatus 40 for coating a cover layer 42 on a textured surface 43 of a body layer 44 of insulation material according to this invention is shown in FIG. 3. The figure illustrates the important elements of the coating apparatus which is intended to be part of a larger machine (not shown) that includes various additional parts and assemblies that provide generally conventional functions, such as coating liquid preparation and delivery, insulation body layer feed handling and coated product, drying/curing and take up processing.

The illustrated apparatus includes a pair of vertical plates 46 which are aligned substantially parallel to each other and spaced apart laterally in the cross machine direction. The plates partially define the side walls of a coating box which confines the liquid coating composition. The plates are fixed relative to each other to maintain vertical and parallel orientation by conventional structural framework which for sake of clarity is not shown. A sheet or continuous strip of insulation board or batting 44 is fed into the apparatus between the parallel plates and above the bottom edges 45 thereof. Preferably prior to operation, the distance between the plates is adjusted utilizing conventional means provided for this purpose, also not shown, so that side walls come within close proximity to the side edges of the insulation body layer 44. The textured surface 43 thus forms the floor of the coating box. The body layer can be supported in a generally horizontal disposition by a table, endless belt, roller conveyor, or similar support means. For continuous insulation material, such as batting, the insulation can be held up by a roller and supply spool at the coating apparatus feed end, and by a roller and take up spool at the discharge end. Tension should be controlled to avoid excessive stretching or breaking the batting. Conventional tension control methods can be used such as maintaining a slight difference between feed roller and take up roller speeds.

The insulation is intended to move through the coating apparatus in the machine direction designated by arrow M. A corrugated profile coating bar 48 is located horizontally between the plates at an elevation above the bottom edges 45 and positioned such that the downwardly facing ridges 49 are in contact with the textured surface 43. It is contemplated that the lateral (i.e., in the cross machine direction) dimension of the insulation body layer can be very large, for example, greater than 4 feet, and further that the coating bar can have the comparatively small cross section dimensions mentioned above. To prevent bowing, bending or other distortion of the coating bar under stress developed during coating, an optional, rigid backing plate 50 can be employed. The backing plate is primarily a structural reinforcing member. It should be made of a suitably strong and rigid composition, preferably a tool strength metal. The backing plate also acts like a dam to prevent the liquid composition from flowing over the coating bar. The shape of the backing plate is not particularly critical. The cross section dimensions should be large enough to eliminate distortion. Preferably, the backing plate is attached at multiple axial points along the coating bar, and more preferably, continuously along the length of the coating bar. The backing plate in the illustrated embodiment is shown attached at the 12:00 o'clock position on the coating bar. The plate can be attached at various other positions, provided that it does not interfere with application of coating liquid to the body layer. The backing plate can be attached to the coating bar by welding or similar conventional methods well known in the fastening art. The backing plate, and/or the coating bar can be attached to the vertical plates also by welding. Optionally, the backing plate and/or bar can be mounted so as to protrude through slots in the vertical plate walls and can be held in place by conventional mechanical fasteners, such as threaded nuts and cotter pins.

In an embodiment of this invention, the coating bar can be rotated about its axis. Rotation is intended to distribute wear of the ridges evenly over the circumference of the bar and to reduce drag on the bar. The coating bar can be allowed to "free wheel" or it can be forced to rotate by drive means such as motors. A single drive can be employed or an independent drive can be deployed at each end of the bar to reduce distortion. The direction of rotation can be counter to or the same as the direction of movement of the body layer. Moreover, rotation speed can be controlled so that the surface speed of the coating bar is the same or different from the machine direction velocity of the body layer. Of course, the backing plate should be detached from the coating bar to permit rotation yet it should be biased against the coating bar to maintain axial linearity of the bar. A bar holder can be used for rotating wire wound coating bars. Bar holders suitable for this purpose are known in the art. Examples of such bar holders include strap bearing and magnetic bearing bar holders. Preferably, the bar holder should be mounted above the coating bar.

Figure 4:
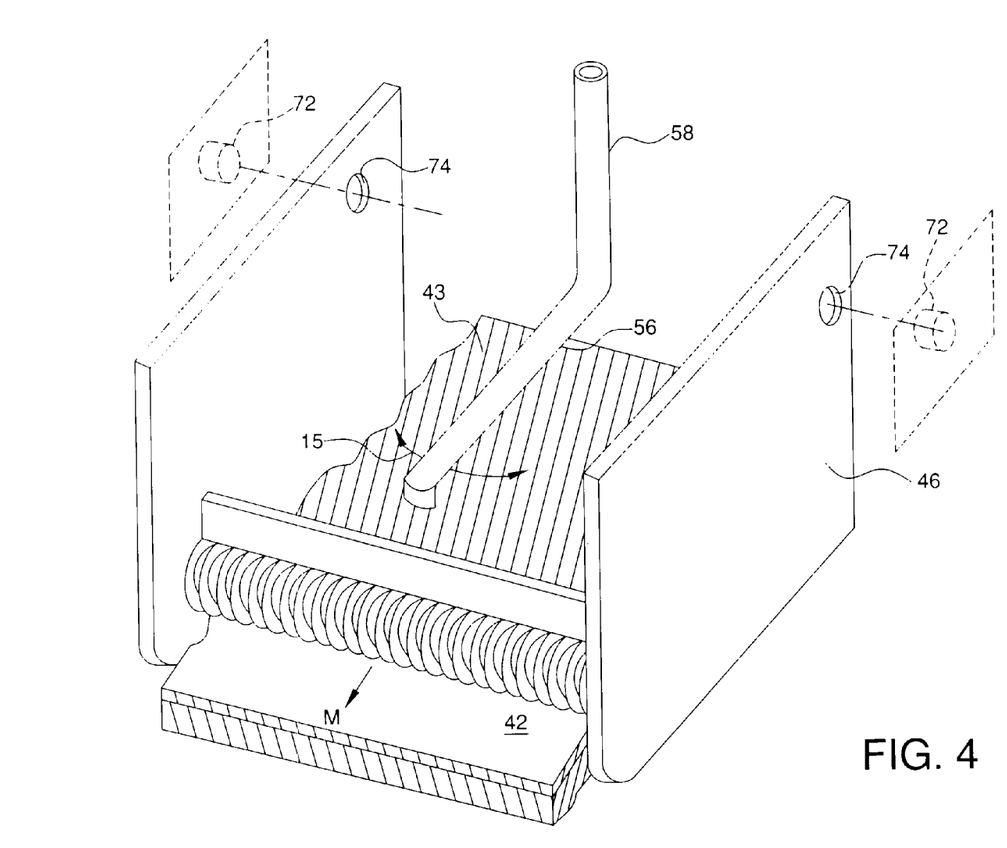
FIG. 4 is a perspective view of another embodiment of an apparatus useful for making coated insulation of this invention.

The coating apparatus further includes a coating liquid delivery system 52. The liquid coating composition 54 is prepared in a supply unit represented schematically by reference numeral 55. The liquid is delivered to the coating apparatus by tube 58 and conduit 56 leading to a nozzle bar 57 positioned upstream of the coating bar 48 and above the textured surface 43. The nozzle bar should have one or more orifices adapted to deposit liquid coating composition onto the textured surface. The configuration of the orifices is not critical provided that a substantially uniform puddle of coating liquid is spread laterally along the fill cross machine direction of the textured surface. The illustrated delivery system is merely representative. For example, an adaptation of the delivery system that is suitable for use in this invention is shown in FIG. 4 to include a conduit 56 equipped with a single discharge nozzle in place of nozzle bar 57. In this adaptation, conduit 56 oscillates through a horizontal arc between the side plates about a vertical axis parallel to the axis of tube 58 so as to spew a meandering puddle of coating liquid onto the surface. In another contemplated embodiment, not shown, the delivery system can have a laterally disposed trough with a bottom opening cross machine direction slit adapted to release a curtain of liquid coating composition onto the textured surface.

In operation, the uncoated body layer of the insulation material is fed horizontally into the coating apparatus. Uncured coating liquid is deposited on the top surface of the body layer, preferably in a puddle extending across the full machine direction of the body layer. The liquid is confined within the box defined by the side walls of the vertical plates, the coating bar and backing plate, and the body layer. Depending primarily on substrate pore size and liquid viscosity, the liquid will commence to penetrate the surface and seep into the uppermost portion of the body layer while the insulation advances toward the coating bar. Preferably the liquid viscosity is high enough to prevent the liquid from penetrating deeply into the body layer under force of gravity alone. The ridges of the coating bar corrugations press the liquid into the upper portion of the body layer while some coating liquid remains on the surface and passes through the grooves between corrugation ridges. Upon arriving at the downstream side of the coating bar, the liquid from within the grooves is released to spread over the neighboring areas of the presently wet surface. This produces a uniform thickness of coating over the full surface of the body layer.

Next the coating liquid is caused to cure to a cohesive solid. If the coating composition is chemically reactive, it may simply be moved over a preferably horizontal conveyor of sufficient length at appropriate speed to allow the reactive component of the liquid to cure prior to collecting the product. If the liquid is radiation curable, photo-reactive or thermally reactive, the wet coating can be exposed to a suitable zone of radiation, light and/or heat to effect a cure. Upon curing the liquid will have changed to a solid state thereby forming a cover layer of uniform thickness permanently bonded to the underlying body layer. Thereafter, the product can be cut to form sheets or batts and collected by stacking or it can be wound up into rolls. Optionally, additional layers, such as more insulation, paper, foil, netting and the like, can be applied to the covered body layer prior to collection.

In a preferred embodiment, a subassembly of the coating apparatus which includes the side plates and coating bar is pivotally mounted in a frame of the coating machine so as to permit angular displacement of the coating bar about an axis parallel to the cross machine direction. This feature is illustrated with reference to FIG. 3 by pivot rod 60 extending horizontally through bearing holes 62 in side plates 46. Ends of the pivot rod are fixed to the frame, not shown, of the coating machine in which the coating apparatus resides. The diameter of the bearing holes is slightly greater than the diameter of the pivot rod, which allows the vertical plates, and therefore, the coating bar, to rotate about the horizontal axis of the pivot rod, as indicated by arrow A.

The pivotal mounting of the subassembly assures that the ridges of the corrugated coating bar are always in contact with the uppermost part of the body layer. Viewed in the machine direction, e.g. as in FIG. 2B, the upper face of the body layer is seen to exhibit a profile of varying height. It can be appreciated that the lateral position and height of the uppermost part of the body layer will vary at least slightly for each cross machine direction section as the body layer passes under the coating bar. By allowing the subassembly to rotate about the pivot rod axis, the coating bar corrugation ridges can float on the highest part of the body layer as it shifts laterally while the body layer advances under the coating bar.

To better advantage, a downward force can be applied to the pivotally mounted subassembly so that the coating bar presses gently onto the top surface of the body layer. The gentle downward pressure induces the web to compress slightly and thereby to increase the contact between the top surface and the coating bar in the cross machine direction. This increased contact further assists in producing a uniform coating thickness. If the downward force is too small, i.e., typically less than a pressure of about 1 lb/ft$^2$ of web surface, the web may not compress sufficiently to contact the full length of the coating bar. If the downward force is too great, the web can break. Downward force of the subassembly can be controlled by various methods such as by utilizing spring compression, hydraulic cylinders or weights.

Alternate means for pivotally mounting the subassembly in the coating machine are also contemplated. For example, the pivot means can comprise stub shafts 72 affixed to the frame of the coating machine (shown in phantom in FIG. 4) extending inward into bearing recesses 74 in the vertical walls. This embodiment would of course employ additional structural supports (not shown) between plates 46 to maintain the juxtaposition of the sides of the subassembly.

Although specific forms of the invention have been selected for illustration in the drawings, and the preceding description is drawn in specific terms for the purpose of describing these forms of the invention, this description is not intended to limit the scope of the invention which is defined in the claims.

What is claimed is:

1. A composite comprising:
   (a) at least one body layer of a flexible, resilient, porous web having a roughly textured face, wherein the body layer comprises insulation having a density of about 0.5 to 7 pounds per foot$^3$, and a thickness of at least about 0.5 inch (1.3 cm); and
   (b) a flexible, resilient cover layer of a solid of a cured liquid cast directly on and directly contacting the roughly textured face, to form a flexible, resilient composite,
   in which the cover layer is a flexible polymer comprising acrylic polymer,
   in which the cover layer has a thickness dimension which is substantially uniform and
   in which the cover layer is permanently embedded into the body layer from the roughly textured face to a depth less than the thickness dimension,
   and in which the body layer comprises a second face opposite to the face embedded by the cover layer and which composite further comprises an outer layer on the second face comprising a material selected from the group consisting of metal foil, organic film, paper and a combination thereof.

2. The composite of claim 1 in which the body layer consists essentially of fiber glass or mineral fibers.

3. The composite of claim 1 in which the cover layer further comprises is a flexible polymer selected from the group consisting of polyvinyl acetate, and polystyrene.

4. The composite of claim 1 in which the thickness dimension is in the range of about 0.01 to 1 mm.

5. The composite of claim 4 in which the thickness dimension of the cover layer has a variation of at most 1 mm.

6. The composite of claim 4 in which the cover layer extends into the body layer to a distance from the roughly textured face at most about 95% of the thickness dimension.

7. The composite of claim 1, wherein:
   the body layer comprises glass fibers or mineral fibers defining the roughly textured face of the body layer.

8. The composite of claim 7 in which the body layer comprises a second face opposite to the face embedded by the cover layer and which composite further comprises an outer layer on the second face comprising metal foil.

9. The composite of claim 7 in which the thickness dimension of the cover layer at any location on the composite differs from the thickness dimension of the cover layer at all other locations on the composite by at most about 1 mm.

10. The composite of claim 7 which is flexible.

11. The composite of claim 1 in which the body layer defines a height and the thickness of the cover layer is less than the height of the body layer.

12. The composite of claim 1, wherein the cover layer is applied to the roughly textured face by:
  casting the liquid directly onto the roughly textured face so as to directly contact the roughly textured face;
  moving the body layer relative to a coating bar having a downwardly facing corrugated axial profile defining alternating ridges and grooves such that the ridges contact the face;
  pressing a first portion of the liquid in proximity of the ridges into the body layer while passing a second portion of the liquid through the grooves;
  allowing the second portion of the liquid to settle in a substantially uniform thickness layer over the first portion of the liquid; and
  curing the liquid to form the solid.

13. The composite of claim 1, wherein the body layer comprises insulation.

14. The composite of claim 13, wherein the body layer has a density of about 1-4 pounds per foot$^3$.

15. The composite of claim 13, wherein the body layer has a thickness of about 0.5 to 6 inches (1.3 to 15 cm).

16. The composite of claim 1, wherein the body layer comprises insulation having a density of about 1-4 pounds per foot$^3$, and a thickness of about 0.5 to 6 inches (1.3 to 15 cm).

17. The composite of claim 1 in which the body layer comprises a second face opposite to the face embedded by the cover layer and which composite further comprises an outer layer on the second face comprising metal foil.

18. The composite of claim 1, wherein the body layer is compressible.

19. An insulation composite produced by a process comprising the steps of:
  placing in a substantially horizontal position a body layer of flexible, resilient insulating material having a density of about 0.5 to 7 pounds per foot$^3$, and a thickness of at least about 0.5 inch (1.3 cm), the insulating material having an upwardly directed, roughly textured face;
  casting a liquid capable of curing to a solid directly onto the textured face so as to directly contact the textured face;
  moving the body layer horizontally relative to a horizontally disposed coating bar having a downwardly facing corrugated axial profile defining alternating ridges and grooves such that the ridges contact the face; pressing a first portion of the liquid in proximity of the ridges into the body layer while passing a second portion of the liquid through the grooves; allowing the second portion of the liquid to settle in a substantially uniform thickness layer over the first portion of liquid; and
  curing the liquid to a flexible, resilient solid, thereby producing a cover layer of substantially uniform thickness permanently embedded in the face of the body layer to form a flexible, resilient composite. in which the liquid is a flexible polymer comprising acrylic polymer,
  and in which the body layer comprises a second face opposite to the face embedded by the cover layer and which composite further comprises an outer layer on the second face comprising a material selected from the group consisting of metal foil, organic film, paper and a combination thereof.

20. A composite comprising
  (a) at least one body layer of a fiber glass or mineral fiber thermal and acoustical insulation material having a roughly textured face; and
  (b) a cover layer of a solid of a cured liquid cast directly on and directly contacting the roughly textured face, to form a composite,
  wherein the cover layer has a thickness dimension which is substantially uniform, and the cover layer is permanently embedded into the body layer from the roughly textured face to a depth less than the thickness dimension, and
  the body layer has an exposed fiber glass or mineral fiber face opposite the roughly textured face,
  in which the cover layer is a flexible polymer comprising acrylic polymer,
  and in which the body layer comprises a second face opposite to the face embedded by the cover layer and which composite further comprises an outer layer on the second face comprising a material selected from the group consisting of metal foil, organic film, paper and a combination thereof.

21. The composite of claim 20, wherein the composite is installed, so as to attenuate transmission of thermal energy or sound through a duct.

22. The composite of claim 20, wherein the body layer is flexible and resilient when the cover layer is cast on the body layer, and the cover layer is flexible and resilient.

23. A composite comprising
  (a) at least one body layer of a fiber glass or mineral fiber thermal and acoustical insulation material having a roughly textured face, the body layer having a second face opposite to the roughly textured face;
  (b) a cover layer of a solid of a cured liquid cast directly on and directly contacting the roughly textured face, to form a composite, in which the cover layer is a flexible polymer comprising acrylic polymer, and
  (c) an outer layer on the second face comprising metal foil, wherein the cover layer has a thickness dimension which is substantially uniform, and the cover layer is permanently embedded into the body layer from the roughly textured face to a depth less than the thickness dimension.

* * * * *